(12) United States Patent
Johnson et al.

(10) Patent No.: US 9,751,765 B2
(45) Date of Patent: Sep. 5, 2017

(54) METHODS TO SUPERHEAT CARBON NANOTUBES

(71) Applicant: University of Cincinnati, Cincinnati, OH (US)

(72) Inventors: Aaron Johnson, Cincinnati, OH (US); David Mast, Cincinnati, OH (US)

(73) Assignee: University Of Cincinnati, Cincinnati, OH (US)

( * ) Notice: Subject to any disclaimer, the term of this patent is extended or adjusted under 35 U.S.C. 154(b) by 0 days.

(21) Appl. No.: 15/044,766

(22) Filed: Feb. 16, 2016

(65) Prior Publication Data

US 2016/0236938 A1 Aug. 18, 2016

Related U.S. Application Data

(60) Provisional application No. 62/115,858, filed on Feb. 13, 2015.

(51) Int. Cl.
*C01B 31/02* (2006.01)

(52) U.S. Cl.
CPC .................. *C01B 31/0253* (2013.01)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04
See application file for complete search history.

(56) References Cited

U.S. PATENT DOCUMENTS

| | | | | |
|---|---|---|---|---|
| 8,216,542 | B2 * | 7/2012 | Han | B82Y 30/00 209/7 |
| 2003/0042128 | A1 * | 3/2003 | Harutyunyan | B82Y 30/00 204/158.2 |
| 2004/0191157 | A1 * | 9/2004 | Harutyunyan | B82Y 30/00 423/447.1 |

* cited by examiner

*Primary Examiner* — Daniel C McCracken
(74) *Attorney, Agent, or Firm* — Wood Herron & Evans LLP

(57) ABSTRACT

A method for annealing multi-walled carbon nanotubes includes applying a high-frequency electromagnetic field to the carbon nanotubes and causing the carbon nanotubes to self-heat to a temperature and for a time effective to reduce defects and reduce a number of walls in some of the carbon nanotubes.

19 Claims, 1 Drawing Sheet

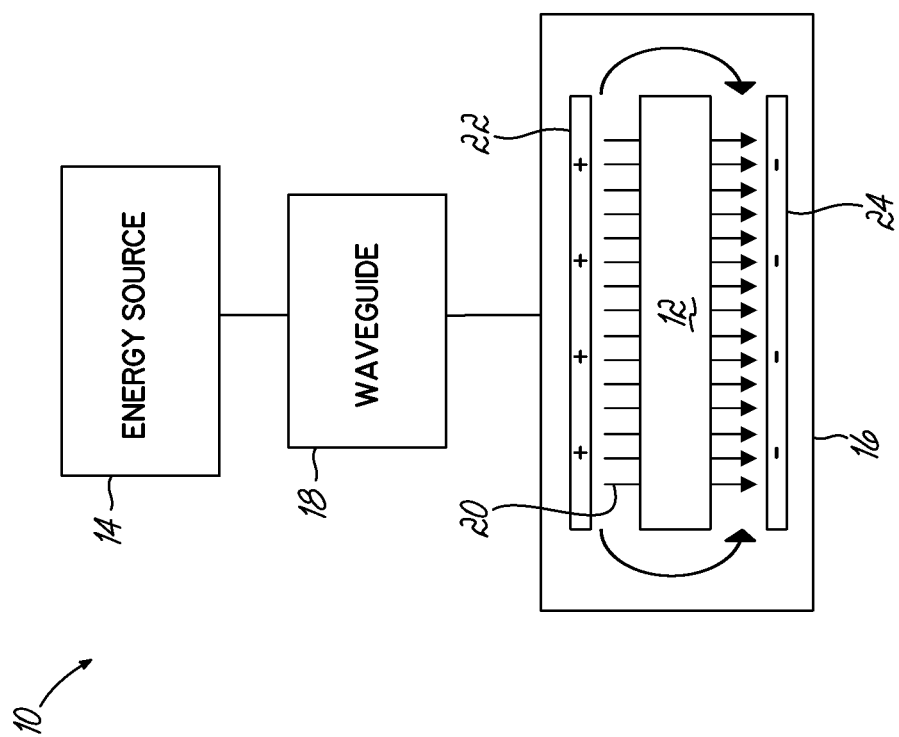

ably, the tube begins to shed its walls over that temperature by the process of sublimation. Thus, CNT diameter and wall-count are a factor when considering the aggregate properties of CNT macrostructures. Such a process has value in that it can transform relatively low-value, high-defect, MWCNTs into low-diameter, high-quality CNTs with properties more amenable to high-performance applications regardless of the final form (e.g., array, fiber, sheet, composite, etc.).

METHODS TO SUPERHEAT CARBON NANOTUBES

STATEMENT REGARDING FEDERALLY SPONSORED RESEARCH OR DEVELOPMENT

The present invention was made, at least in part, with support from the U.S. Government and funds identified as NSF Award No. 7756, awarded by the National Science Foundation. The U.S. Government has certain rights in the present invention.

TECHNICAL FIELD

The present invention relates generally to carbon nanotubes and, more specifically, to methods to superheat carbon nanotubes to reduce defects and reduce a number of walls in some of the carbon nanotubes.

BACKGROUND

The commercial applications of carbon nanotubes (CNTs) are numerous, but the creation of commercially viable products capable of sustaining industry is still a work in progress. In the pursuit of this goal, researchers are working to create CNTs with properties needed for individual CNT applications (e.g., transistors, heat sinks), and CNTs with properties suitable for assembly into macroscopic materials (e.g., yarns, sheets, and composites) that have high thermal conductivity, electrical conductivity, and mechanical strength. The consistent production and availability of the application-specific, ideal CNTs in laboratory and industrial scale quantities remains a challenge. Additionally, assembling CNTs in a fashion that yields macroscale properties even closely comparable to the properties of their constituents (i.e., the individual CNTs) also remains a challenge.

In the growth of carbon nanotubes using, for example, chemical vapor deposition (CVD), the length of the CNTs is relatively simple to control. However, carbon nanotubes, as grown, contain defects. These defects compromise the quality of the carbon nanotubes in regards to their thermal and electrical conductivity, as well as their mechanical integrity. Moreover, improved CNT alignment, packing density, and the presence of RBM bands in the Raman spectra are important to improve the thermal conductivity of CNT materials and to achieve a CNT superfiber. It is crucial to the future viability of the industry that these parameters are either corrected or controlled to deliver the most effective product. In addition, CNTs may be single-walled nanotubes (SWNTs) or multi-walled nanotubes (MWNTs). The carbon nanotubes are difficult to control with respect to the wall-count during the growth process. A routine process may be used to grow large quantities of relatively long multi-walled carbon nanotubes. However, carbon nanotubes synthesized with conventional MWCNT growth and heat treatment processes inhibit the liquid-state assembly that is likely needed to realize individual CNT properties in macroscopic materials (e.g., fibers and sheets) due to the properties offered (e.g., mechanical, electrical, thermal, and wall-count) and the limited attainable purity (e.g., residual catalyst, non-nanotube carbon, etc.).

Thermal treatment of CNTs aims to reduce the defects that limit the engineering properties of the tubes. One thermal treatment process includes heating CNTs to up to 2800° C., which is the phase transition temperature of graphite, within a high vacuum. During such a thermal treatment process, defects incurred during the growth process of the CNTs can be eliminated, along with graphitic impurities, as a function of the annealing temperature. Addition One method of heating CNTs includes using a DC current. If a CNT is connected to two electrodes and subjected to a suitable DC current, the tube would increase in temperature as a result of Joule heating. The effect of this technique is mainly dominated by Joule heating and Fourier's law of conduction: Joule heating is the source and Fourier's law determines the temperature profile. If a CNT yarn or sheet is held stationary between the two electrodes and the temperature at a point rises above that of which the carbon atoms will remain in the CNT molecules, sublimation will begin.

However, DC annealing/sublimation is not a satisfactory solution for a variety of reasons. Considering the paradigms of the polymer production industry, which is likely the path that the CNT superfiber will follow, a liquid processing technique must be employed to fully realize the potential of these carbon polymers. In order to do this, the CNTs must be heat-treated prior to the liquid spinning process. The DC annealing techniques are inadequate due to the extremely high temperatures of the material under process (e.g., greater than 2800° C.) and the impracticality of uniform application of DC to an array of CNTs (i.e., an areal growth of what may seem to be uniform length but is, in fact, an agglomeration of billions of CNTs following a length distribution resembling a Gaussian distribution).

Thus, there is an increasing need to provide a solution capable of producing and processing improved carbon nanotubes that address one or more of the above drawbacks. For example, if a suitable CNT raw material may be produced, liquid-state spinning on CNTs with optimal morphology may, if properly performed, result in superior quality CNT superfibers.

SUMMARY

In an embodiment, a method for annealing multi-walled carbon nanotubes includes applying a high-frequency electromagnetic field to the carbon nanotubes and causing the carbon nanotubes to self-heat to a temperature and for a time effective to reduce defects and reduce a number of walls in some of the carbon nanotubes.

BRIEF DESCRIPTION OF THE DRAWING

The FIGURE is schematic representation of a method for annealing carbon nanotubes according to another embodiment of the present invention.

DETAILED DESCRIPTION

Embodiments of the present invention are directed to methods for annealing carbon nanotubes (CNTs). The exemplary methods described herein include heating CNTs up to temperatures above the stable vaporization or sublimation point of the CNTs in order to improve material properties. As described below, the sublimation process can be controlled to thermally treat assembled CNT materials in superheated thermodynamic states to provide improvements for high-quality and industrially efficient CNT materials. Further, subjecting CNT materials to alternating electric or electromagnetic fields, with the proper boundary conditions, causes the CNTs to reduce mass while improving their quality.

Carbon Nanotube Starting Material

The form of carbon nanotubes used in embodiments of the present invention may vary. CNTs may be, for example, nanometers in diameter and may be microns to centimeters in length. Accordingly, CNTs may have a large aspect ratio due to the orders of magnitude difference between the diameter and length. The carbon nanotubes may be single-walled nanotubes or multi-walled nanotubes. CNTs may be annealed according to the present invention before or after the CNTs have been arranged in a macro-scale form. Exemplary macro-scale forms of CNTs include pressed sheets, bucky paper, aligned sheets, thread, fiber or yarn, and arrays (also known as vertically aligned CNTs). The heat treatment of as-grown CNTs (e.g., an array) prior to assembly in another macro-scale form may yield higher quality CNTs because the necessity of maintaining macro-scale material integrity during heating is reduced.

Optional Pre-Processing Stage

Embodiments of the present invention optionally include subjecting CNTs to pre-processing. A primary purpose of subjecting the CNTs to pre-treatment is to remove defects within the individual walls of the CNTs and to remove impurities present after synthesis in the macro-scale structure. Examples of such impurities include amorphous carbon and residual catalysts. Pre-processing may include conventional methods of treating CNTs. These methods may include, for example, exposing the CNTs to an acidic environment, heating the CNTs in an oxidative atmosphere to temperatures below the degradation point of carbon nanotubes as seen in thermogravimetric analyses, and/or heating the CNTs in an inert gas environment to a temperature up to or slightly above 2800° C. By way of example, the CNTs may be heated to a desired temperature in a conventional furnace at temperatures less than 500° C. If oxygen is present, temperatures above approximately 500° C. may damage the CNTs depending on the sample. In another exemplary embodiment, hydrogen may be present in a pre-processing stage to bind with impurities in the CNTs, such as oxygen. In an inert environment, CNTs will not degrade until they become thermodynamically unstable. Accordingly, a hydrogen environment will have a different temperature above which the CNTs will be damaged as compared to an environment containing oxygen. The pre-processing steps may also be completed in a vacuum. After the CNTs are subject to pre-processing, the CNTs may be superheated, as described below.

Superheating Stage

In embodiments of the present invention, a high-frequency electromagnetic field may be generated and applied to CNTs. When the high-frequency electromagnetic field is applied, the CNTs undergo localized self-heating. The self-heating allows for to CNT temperatures above those that may be achieved using conventional methods, such as heating in a furnace. The superheating process may take place in a vacuum or in a non-vacuum environment. In an exemplary embodiment, a vacuum of $10^{-7}$ ton or greater may be used so as to avoid the introduction of defects in the graphitic structure of the CNT walls due to oxidation. In non-vacuum environments, heat conduction from the CNTs to surrounding gases may result in non-uniform application of the treatment.

Embodiments of the present invention may include a waveguide used to more precisely apply the high-frequency electromagnetic field, which may result in more precise self-heating of the CNTs. In one embodiment, a CNT array or other "aligned" CNT material is placed within the confines of a waveguide and an alternating electric field is created. Moreover, embodiments of the present invention may include rounded edges and/or corner paddles to improve the field pattern due to edge effects. When using a waveguide, it may be possible to determine where the intensity of the electric field is greatest. Exemplary waveguides that are useful in the present invention include Transverse Electromagnetic (TEM), parallel plate, or a resonator with a standing wave, among other forms. Devices other than a waveguide may be used in embodiments of the present invention including, for example, a reflecting dish or lens, parallel transmission lines, an antenna, or a capacitor capable of supporting microwave frequencies.

With reference to the FIGURE, in one embodiment, a for annealing carbon nanotubes 12 in the form of an array is shown. An energy source 14, which provides properly tuned microwave energy, is coupled to, for example, a parallel rod capacitor 16 via a coax coupling from a waveguide 18. An electromagnetic field 20 is created between two electrodes 22, 24 of the parallel rod capacitor 16. The electrically small capacitor applicator may have dimensions on the order of ⅛ of the operating wavelength or smaller. This dimension essentially renders the wave equation to be insignificant considering the physics in play. At this pseudo-threshold, a lumped capacitor model is considered to be reasonable. In an embodiment where the operating wavelength is about 2.45 GHz, the wavelength corresponds to a capacitor with a maximum dimension of approximately 1.5 cm. Because the parallel rod capacitor 16 linearizes the electromagnetic field 20, an environment coupled with sufficient vacuum may likely be created to precisely apply the desired effect. The CNT array 12 may be conveyed through the generated electromagnetic field 20, and relatively uniform results may be expected. In an embodiment of the present invention, capacitors are staggered in a conveyor system (not shown) within a vacuum allowing large surface areas to be treated consistently due to the coaxial and precise electric field offered by the capacitor applicator and its linear/planar nature.

It should be recognized that the method of applying the high-frequency electromagnetic field to CNTs may vary based on the starting form of the CNTs and the intended use. An advantage of certain embodiments of the present invention is that the superheating stage may be accomplished in either a batch process or a continuous process. Additionally, the high-frequency electromagnetic field may be applied generally parallel to or generally transverse to the orientation of the CNTs. Applying the field parallel to the CNT orientation may be preferred. As in the optional pre-processing stage, the superheating stage may be completed in a non-inert environment, an inert environment, or a vacuum.

In certain embodiments of the present invention, using CNT arrays as the starting material may be advantageous due, in part, to the fact that the CNT orientation is more predictable than many other macro-scale forms. Because the CNTs have such large aspect ratios, having a more predictable CNT orientation is beneficial. As discussed above, the electric field employed has a predominant orientation, and aligning the field with the CNT orientation may allow for maximal heating. In one embodiment, energy from a microwave source may be directed within a waveguide to a standing wave and a CNT array may be subjected to the transverse-elecromagnetic field such that the CNTs are parallel to the electric field at a point of an antinode (not shown). In this configuration, approximately uniform heating of the CNTs can be produced.

Wavelength

Wavelength (frequency) is important as it affects the nature of the electron motion within the CNTs. Embodiments of the present invention may utilize a variety of wavelengths to achieve annealing in CNTs. For example, radio waves or microwaves may be used. By way of example and without limitation, waves of about 1 MHz to 100 GHz may be applied to the CNTs. In one embodiment, a microwave of about 2.45 GHz is applied to the CNTs. It may be beneficial to apply a high-frequency electromagnetic field using a wavelength close in length to the CNTs being treated. This may allow for enhanced CNT self-heating through a resulting resonance.

Further, the wavelength used determines the physical size of the applicators used to process the materials. For example, a wavelength above 2.45 GHz reduces the physical dimensions of either the waveguide or capacitor that supply the electric field to the CNTs. It should be recognized that the frequency of the wavelength used may vary based on the starting form of the CNTs and the intended use.

Effect

The higher CNT temperatures that are reached using a high-frequency electromagnetic field may result in an improved thermal annealing process. A temperature range of 2800° C. to 5000° C., particularly 2800° C. to 3000° C., may be utilized. Higher temperatures may be employed if no oxygen is present. Additionally, the amount of time required for the thermal annealing process according to embodiments of the present invention may be on the order of seconds or minutes, as compared to the order of hours necessary for conventional heat treatment or annealing. Exemplary embodiments of the present invention may include applying the high-frequency electromagnetic field to the CNTs for about 30 seconds (or less) to about one minute. Reducing the annealing time also reduces the time during which the CNTs are exposed to oxygen at the superheated temperatures. Because carbon in the superheated CNTs may combine with any oxygen in the environment, reducing the processing time is advantageous in that the CNTs are more likely to remain intact.

An advantageous aspect of the present invention is that the properties of multi-walled carbon nanotubes may become more like properties of single-walled carbon nanotubes. Carbon from the outer walls of MWCNTs may sublime or otherwise separate from the CNT while being subjected to the high-frequency electromagnetic field. The sublimation of MWCNTs may produce RBM bands (or modes) in the Raman spectra, which is important for the thermal conductivity in aligned macro-materials. Further, the quality of the CNTs may be improved due to a reduction in graphitic defects in the CNTs.

The successful application of such methods described above allows for the economic production of low-walled or single-walled, high-purity CNTs. Thus, one use of CNTs treated according to methods of the present invention may provide a missing raw material required for the liquid-state extrusion of CNT superfibers. In addition to its economic value, the improved CNTs may relieve constraints laid upon the synthesis process, leading to a more efficient use of manpower resources and better quality CNTs (e.g. chirality focused synthesis).

While all of the invention has been illustrated by a description of various embodiments and while these embodiments have been described in considerable detail, it is not the intention of the Applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicants' general inventive concept

What is claimed is:

1. A method for annealing multi-walled carbon nanotubes comprising:
   applying a high-frequency electromagnetic field to the carbon nanotubes; and
   causing the carbon nanotubes to self-heat to a temperature and for a time effective to reduce defects and reduce a number of walls in some of the carbon nanotubes,
   wherein causing the carbon nanotubes to self-heat includes reducing the number of walls in some of the carbon nanotubes through sublimation.

2. The method of claim 1, wherein applying the high-frequency electromagnetic field includes generating electromagnetic waves having a wavelength of about 1 MHz to about 100 GHz.

3. The method of claim 2, wherein applying the high-frequency electromagnetic field includes generating microwaves.

4. The method of claim 2, wherein applying the high-frequency electromagnetic field includes generating radio waves.

5. The method of claim 1, wherein applying the high-frequency electromagnetic field includes applying the high-frequency electromagnetic field in an inert environment.

6. The method of claim 1, wherein applying the high-frequency electromagnetic field includes applying the high-frequency electromagnetic field for a time of less than about one minute.

7. The method of claim 1, wherein applying the high-frequency electromagnetic field includes applying the high-frequency electromagnetic field for a time of at least about thirty seconds.

8. The method of claim 1, wherein applying the high-frequency electromagnetic field includes using at least one of a waveguide, a reflecting lens dish, and a capacitor applicator.

9. The method of claim 1, wherein causing the carbon nanotubes to self-heat includes causing the carbon nanotubes to self-heat to a temperature of about 2800° C. to about 5000° C.

10. The method of claim 1, further comprising:
    conveying the carbon nanotubes through the high-frequency electromagnetic field.

11. The method of claim 1, further comprising:
    processing the carbon nanotubes before applying the high-frequency electromagnetic field.

12. The method of claim 11, wherein processing the carbon nanotubes includes preheating the carbon nanotubes.

13. The method of claim 12, wherein preheating the carbon nanotubes includes preheating the carbon nanotubes to a temperature of less than about 500° C. in an oxidative environment.

14. The method of claim 11, wherein processing the carbon nanotubes includes processing the carbon nanotubes in an inert environment or an acidic environment.

15. The method of claim 11, wherein processing the carbon nanotubes includes processing the carbon nanotubes in a vacuum.

16. A method for annealing multi-walled carbon nanotubes comprising:
  applying a high-frequency electromagnetic field to the carbon nanotubes for a time of less than about one minute; and
  causing the carbon nanotubes to self-heat to a temperature and for a time effective to reduce defects and reduce a number of walls in some of the carbon nanotubes.

17. The method of claim 16, wherein causing the carbon nanotubes to self-heat includes causing the carbon nanotubes to self-heat to a temperature of about 2800° C. to about 5000° C.

18. A method for annealing multi-walled carbon nanotubes comprising:
  applying a high-frequency electromagnetic field to the carbon nanotubes; and
  causing the carbon nanotubes to self-heat to a temperature of about 2800° C. to about 5000° C. and for a time effective to reduce defects and reduce a number of walls in some of the carbon nanotubes.

19. The method of claim 18, wherein applying the high-frequency electromagnetic field includes applying the high-frequency electromagnetic field for a time of less than about one minute, and
  wherein causing the carbon nanotubes to self-heat includes reducing the number of walls in some of the carbon nanotubes through sublimation.

* * * * *

UNITED STATES PATENT AND TRADEMARK OFFICE
CERTIFICATE OF CORRECTION

PATENT NO. : 9,751,765 B2
APPLICATION NO. : 15/044766
DATED : September 5, 2017
INVENTOR(S) : Aaron Johnson et al.

Page 1 of 1

It is certified that error appears in the above-identified patent and that said Letters Patent is hereby corrected as shown below:

In the Specification

Column 4, Line 17 reads "With reference to the FIGURE, in one embodiment, a for" and should read -- With reference to the FIGURE, in one embodiment, a system 10 for --

Signed and Sealed this
Second Day of January, 2018

Joseph Matal
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

PATENT NO. : 9,751,765 B2
APPLICATION NO. : 15/044766
DATED : September 5, 2017
INVENTOR(S) : Aaron Johnson et al.

Page 1 of 1

It is certified that error appears in the above-identified patent and that said Letters Patent is hereby corrected as shown below:

Column 1, Line 7, "The present invention was made, at least in part, with support from the U.S. Government and funds identified as NSF Award No. 7756, awarded by the National Science Foundation. The U.S. Government has certain rights in the present invention." should be --This invention was made with government support under 1120382 awarded by National Science Foundation. The government has certain rights in the invention.--.

Signed and Sealed this
Twenty-ninth Day of December, 2020

Andrei Iancu
*Director of the United States Patent and Trademark Office*